Oct. 14, 1952 C. REINHOLD 2,613,995
SPRAY GUN FOR PAINTS AND OTHER LIQUIDS
Filed April 24, 1945 3 Sheets-Sheet 1
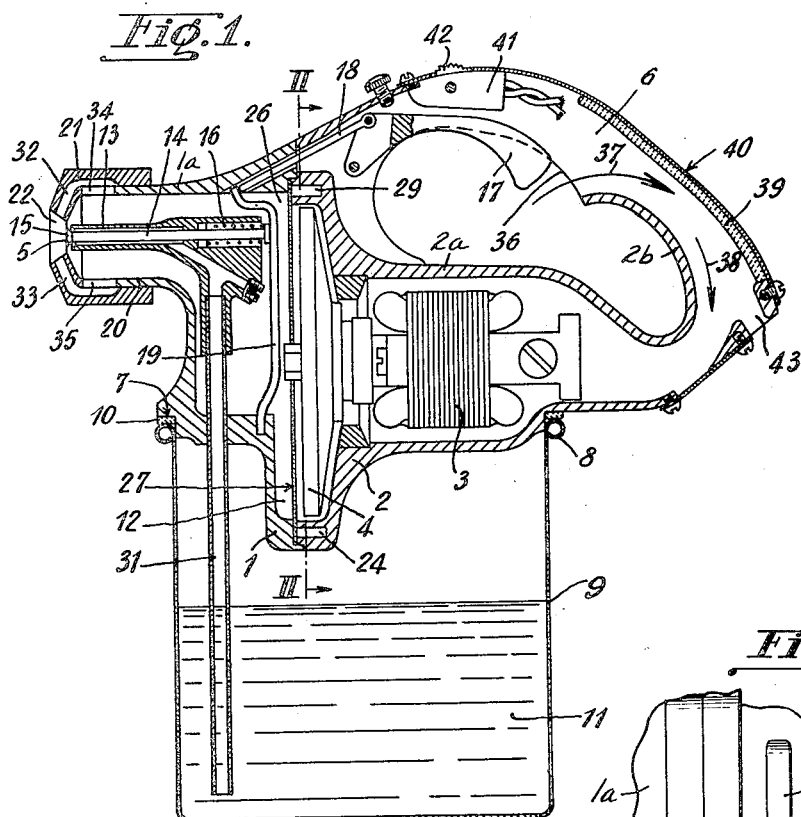
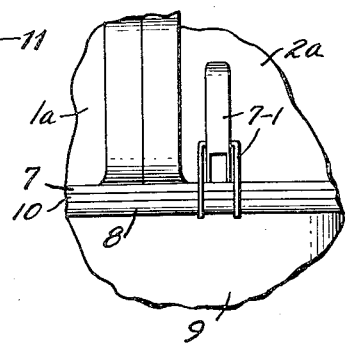
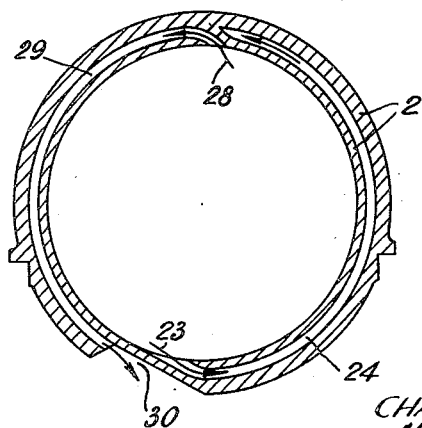
INVENTOR
CHARLES REINHOLD
BY Henry J. Luckl
ATTORNEY Oct. 14, 1952 — C. REINHOLD — 2,613,995
SPRAY GUN FOR PAINTS AND OTHER LIQUIDS
Filed April 24, 1945 — 3 Sheets-Sheet 2
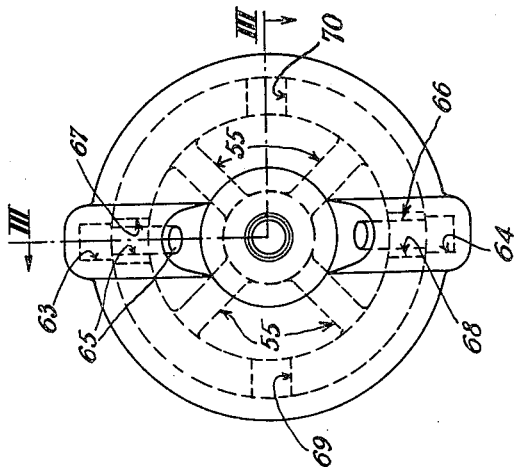
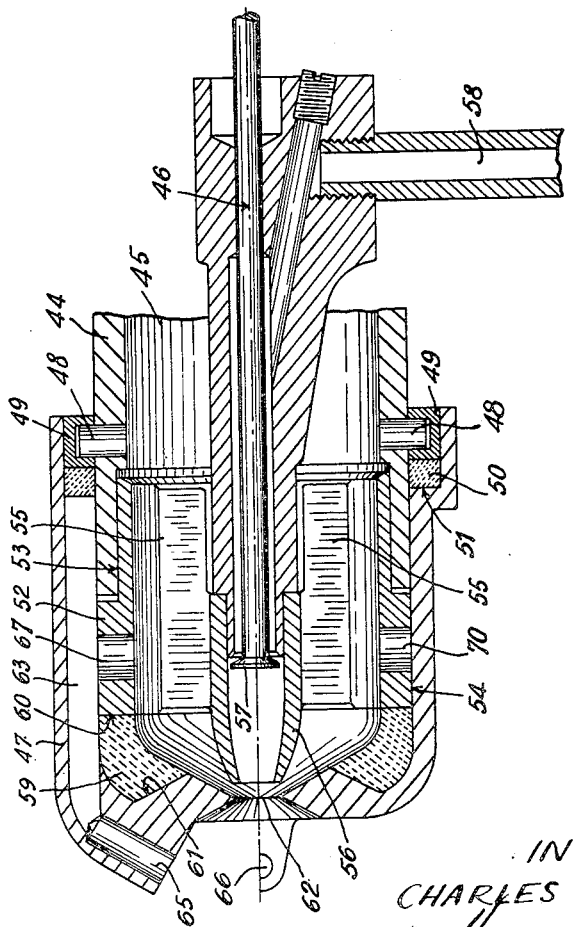
INVENTOR
CHARLES REINHOLD
By Henry J. Luckel
ATTORNEY Oct. 14, 1952     C. REINHOLD     2,613,995
SPRAY GUN FOR PAINTS AND OTHER LIQUIDS Filed April 24, 1945     3 Sheets-Sheet 3

INVENTOR
CHARLES REINHOLD
BY Henry J. Lucke
ATTORNEY

Patented Oct. 14, 1952

2,613,995

UNITED STATES PATENT OFFICE 2,613,995

SPRAY GUN FOR PAINTS AND OTHER LIQUIDS

Charles Reinhold, Geneva, Switzerland

Application April 24, 1945, Serial No. 589,964
In Switzerland April 24, 1944

8 Claims. (Cl. 299—96)

The present invention relates to a spray-gun for paints and other liquids, which is characterised by the fact that it comprises a housing within which are fixed a small electric motor, a device propelling air and driven by this motor, at least one nozzle combined with at least one atomiser through which the air is expelled, means for controlling the atomiser, a grip for holding the apparatus during its use and means for detachably fitting the housing over an open receptacle, so that the atomiser dips deeply into the receptacle and into liquid contained in this receptacle.

The annexed drawing represents, by way of example, one embodiment as well as variants of certain details of the spray-gun to which the invention relates.

Figure 1 is a view in central vertical section of the complete apparatus.

Fig. 1a is a fragmentary side elevation showing one of the toggle fastening clamps provided for attaching the housing containing the spray mechanism, to the receptacle for liquid to be sprayed.

Figure 2 is a view in vertical section taken on the line II—II of Figure 1, showing details of the fan or blower casing.

Figure 3 represents, in longitudinal central section taken along the line III—III of Figure 4, a variant of the nozzle and of the atomiser.

Figure 4 is a front elevation of the nozzle of Figure 3.

Figure 5:
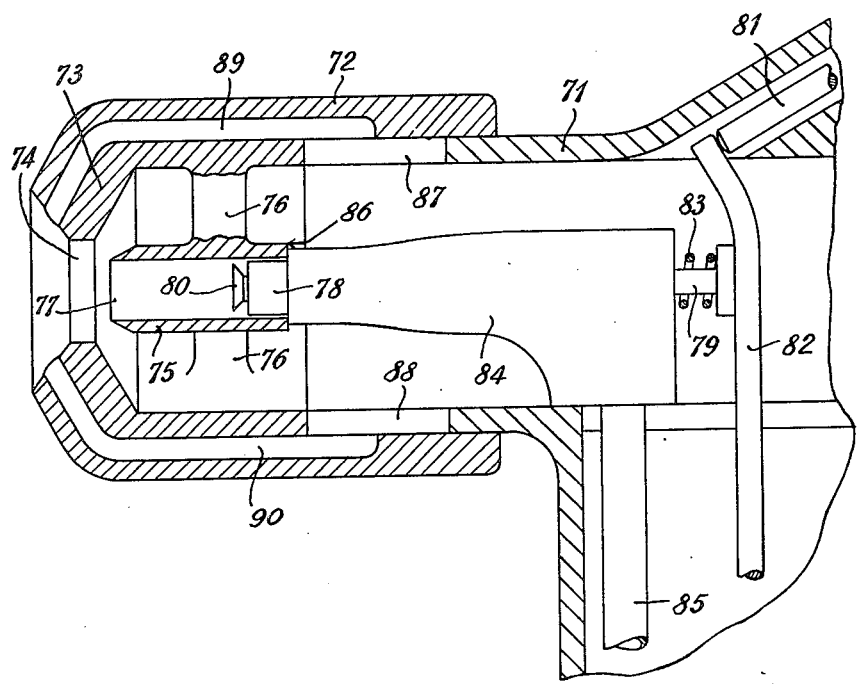
Figure 5 is a view corresponding in general to that of Fig. 3, but showing another variant of the nozzle.

The spray gun represented in Figs. 1 and 2 comprises a frame housing made up of two pieces 1 and 2 in the shape of shells, inside of an intermediately disposed casing portion 2a in which are mounted an electric motor 3 and a blower or fan 4, the latter being mounted on the drive shaft of the motor, so as to be driven by it. The housing also includes a nozzle portion 1a enclosing an atomiser 5, and has a handle portion 2b forming a grip 6 which curves downwardly from above the blower 4 to a position behind the motor and near the level of the rotative axis thereof, an impervious packing ring 10 for sealing the joinder between the housing and the rim 8 of a receptacle 9. Toggle levers, see 7—1, Fig. 1A, are provided on the housing adjacent the flange 7 for engaging such rim 8 and clamping the housing and receptacle tightly together in the position shown in the drawing, whereby the housing constitutes an airtight cover for the receptacle 9 containing the paint or other liquid 11 to be sprayed.

The lower portion of the housing, including the hollow portion 12, depends below the flange 7, so as to extend down into the interior of the receptacle 9 when the housing is fitted on to the receptacle, the motor 3 and the blower 4 being thereby lodged partly in the interior of the receptacle and the rotative axis thereof being normally horizontal, as is seen in the drawing. Thanks to this arrangement, the spray-gun and the receptacle form a compact construction.

The atomiser 5 consists of a pipe 13 fitted internally with a metering rod 14 having a head 15 which acts as a valve. The head 15 is situated at the outlet end of the atomiser. The opening movement is towards the exterior. A spring 16 acting on the rod 14 induces the atomiser to remain closed. The opening is effected by pressing a trigger 17 fixed to the grip 6 and acting, through the intermediary of a rod 18 and a lever 19, on the end of the rod 14 opposed to that presenting the head 15. It is seen in Fig. 1 that, if the grip 6 is held in the hand, a simple pressure of the finger on the trigger 17 makes the lever 19 rock to the left in the drawing and, consequently, compress the spring 16 and raise the head 15 as a valve. This movement of the valve towards the exterior has the effect of avoiding the fouling of the orifice of the atomiser. The inside of the pipe 13 is in communication with a vertical tube 31 projecting below the housing for immersion in the liquid 11, as can be seen in the drawing.

The nozzle 20 is fitted with a conical cap 21 provided with an outlet 22 concentric with the outlet of the atomiser.

Figure 2A:
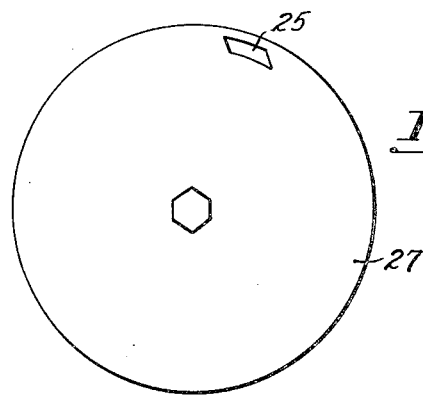
Fig. 2A is a similar view, but taken to the left of line II—II, so as to show the diaphragm in front elevation.

The air forced by the rotating part of the blower 4 into the peripheric region of the inside of the casing of this blower passes tangentially, as indicated by the arrow 23 (Figure 2), into a semi-circular channel 24 in the casing to reach a region 26 inside the housing and separated by a diaphragm 27 from the region in which the blower and the motor are situated, by passing through an aperture 25, Fig. 2a, in this diaphragm. It is through this aperture that the air is brought to the nozzle, which occupies an eccentric position in relation to the axis of the blower. The air compressed by the blower passes, also tangentially, as indicated by the arrow 28, into another semi-circular channel 29, the entrance to which is situated in the upper region of the casing of this blower, whereas its outlet leads at 30 into the lower region of this blower inside the receptacle 9 into which the air is discharged. The air thus driven into this receptacle exercises a certain over-pressure on the liquid 11 and helps it to rise in the pipe 31.

It is easily understood that, when the blower functions and the trigger 17 is pressed, the air leaving the nozzle 20 produces a drop in pressure, effecting intake of liquid 11 through pipe 31, which intake is facilitated by the over-pressure existing in the receptacle 9. Such drop in pressure also effects atomization of the liquid 11 passing from the upper end of pipe 31 into the air stream in the nozzle.

The cap 21 is provided with two internal passages 32, 33 for the intake of air in two jets in the direction of the liquid jet issuing at 22. In the position shown in the drawing, the passages 32, 33 coincide with two openings 34, 35 in the nozzle and convert the jet into a flat stream, horizontal in the position of the apparatus represented in the drawing. The cap 21 revolves on the nozzle. By turning it 90°, the passages 32, 33 are brought to coincide with two similar openings at 34, 35 but 90° distant, which converts the jet into a flat stream issuing perpendicularly to the position of the apparatus as shown in the drawing. In any other angular position of the cap 21, the air inside the nozzle cannot reach the passages 32, 33 and the circular liquid jet issuing from the nozzle is not affected by air from these passages.

The grip 6 is hollow and curved. On its inner surface, near the trigger 17, it presents an opening 36 through which the air drawn in by the blower 4 penetrates into the frame 1, 2. This air follows the curved form of the grip 6, as indicated by the arrows 37, 38. Before reaching the blower it passes through the electric motor and so ensures the cooling of the latter. However, the air of the premises on which a spray-gun is employed is generally charged with particles of paint which are liable to foul the motor. Means are therefore provided inside the grip for filtering the air before its arrival at the motor. These means consist of a strip 39 of material such as felt, for example, which retains the impurities contained in the air. This strip 39 forms a lining placed against the outer detachable wall 40 of the curved inner pipe of the grip. Owing to this curved form, the impurities are directed, by the centrifugal force, against this lining, where they remain caught. An excellent purification of the air is thus obtained without arresting its speed, as would be the case were it obliged to pass through a usual filter.

In the upper region of the grip 6, an electric switch 41 is provided, part of the push 42 of which alone projects out of this grip. This switch governs the motor 3. The feeder wires (not shown) lead out of the grip 6 by a passage 43.

It will be seen from Fig. 1 of the drawings that the longitudinal axes of the handle grip 6 and the nozzle assembly are located in and extend along a vertical plane which passes longitudinally through the rotative axis of the motor and fan unit. This structural arrangement, in combination with the position of the motor and fan unit relative to the receptacle, produces a well balanced and easily handled spray gun which will not tire the user even when operated continuously through extended periods of time.

The spray-gun represented may also include an electric heating resistance, placed in such a way as to be immersed in the liquid 11 when the housing 1, 2 is fitted on to the receptacle 9. Such a resistance is of advantage when liquids have to be sprayed whose viscosity is too great when cold.

The presence of the semi-circular channel 29 has the effect of preventing a projection of liquid into the interior of the blower in the case where the spray-gun is shaken or tilted during working. Thus the blower is not likely to get fouled. The spraying nozzle being situated in the front of the apparatus and in its upper region, it is possible constantly to see the jet at the same time as the surface that is being painted. Detaching the spray-gun from the receptacle and fitting it on to another of the same diameter is the work of an instant. The method of fixing the housing 1, 2 to the receptacle may differ from the one indicated. Moreover, the housing 1, 2 may have a different shape from that represented and may be made to fit on to receptacles having also a different shape from that represented—for example, receptacles with a narrow neck. Finally, in a variant, the frame containing the blower, the motor and the atomiser need not constitute the cover of the receptacle, but may be contrived so as to fit on to the receptacle elsewhere than on its edge or its mouth.

In the apparatus represented on Figs. 1 and 2, the following phenomenon is produced:

The air issuing from the blower and penetrating into the nozzle takes on, inside the latter, a whirling movement round the axis of the nozzle owing to the fact that it issues tangentially from the blower. The result of this is that it is difficult to obtain, at the exit from the nozzle, an atomised stream of a flat shape, the stream having a tendency to revolve round an axis prolonging that of the nozzle. Moreover, the air issuing from the latter, owing to this rotary movement, imparts a centrifugal action to the particles, which rapidly draws the latter away from the axis; moreover, they try to escape by the tangent. The heaviest particles, being attracted more, deviate more quickly than the lighter particles, with which they collide and unite to form still heavier particles. The result is a jet containing fine particles in the centre and coarser particles at the periphery; the coarser particles then fall like rain and it is impossible to obtain a proper projection of the liquid. So as to obviate this rotation of the jet, it is essential that the air should arrive at the orifice of the nozzle in the form of thin threads free from any whirling movement.

The nozzle represented on Figs. 3 and 4 eliminates the drawbacks noted.

At 44 on said figures is indicated that part of the body of the spray-gun through the interior 45 of which the air coming from the blower (not represented) arrives in the nozzle in whirling round the axis 46 of this nozzle. The latter possesses a cap 47 fitting on to part 44 by means of spurs 48 integral with 44 and lodging in a groove of an inner ring 49 integral with the cap and providing a fixing means of the bayonet type. A washer 50 of elastic material is pressed between the ring 49 and an inner stop-shoulder 51 of the cap 47.

Inside the cap 47 is a cylinder-shaped part 52, cooperating through its outer surface, on the one hand, at 53 with the part 44 of the body of the apparatus and, on the other hand, at 54 with the interior of the cap 47. This inner part 52 presents flat radial ribs 55 extending along its whole length and supporting the outlet tube 56 for the liquid. At 57 is indicated the valve governing the discharge of the liquid into the interior of this tube. The tube 58, corresponding to the tube 31 of Figure 1, serves to convey liquid from the container to the nozzle.

An annular gasket 59 of flexible material, such as rubber, for example, is pressed between the end 60 of the inner part 52 and the crown 61 of the cap 47. At 62 is seen the central orifice of the cap 47 through which the air and the liquid to be sprayed issue from the spray-gun.

The flat radial ribs 55 which support the outlet tube 56 act as deflectors, breaking the turbulence of the air stream and directing it along flat trajectories parallel to the axis of the nozzle.

The cap 47 is mounted so as to revolve on the part 44 of the body of the apparatus and it presents two longitudinal inner channels 63, 64 serving to bring air to the central atomized liquid jet with the object to be described. These longitudinal channels extend to the end of the cap through obliquely drilled holes 65, 66 opening beyond the orifice 62. In a certain angular position of the cap 47 in relation to part 44 (the angular position represented in Figure 4 and in the upper half of Figure 3), the channels 63 and 64 coincide with two openings 67, 68 made radially in the cylindrical part 52. The air circulating longitudinally inside the nozzle thus penetrates into the channels 63, 64 by the openings 67, 68. This air, issuing from these channels at 65, 66 converts the central atomized liquid jet escaping from the orifice 62 into a flat stream. By turning the cap 90°, the channels 63, 64 may be brought to coincide with two other holes 69, 70 similar to 67, 68 for converting the jet into a flat stream perpendicular to the one which has just been considered.

The device represented on Fig. 5 comprises an air-tube 71, which may be that of a spray-gun of the type represented on Figs. 1 and 2. At the end of this air-tube a movable cap 72 is fitted forming the outlet end of the said air-tube. This cap is provided with a conical part 73 pierced in its centre as indicated at 74. A nozzle 75 is placed axially inside the cap 72, to which it is joined by radial arms 76. The outlet 77 of the nozzle 75 is slightly set back from the outlet 74 of the cap 72.

In the inlet part of the nozzle 75 is a metering assembly consisting of a tubular part 78 of smaller diameter, leaving an annular space between it and this nozzle. Inside this tubular part is inserted a sliding rod 79 fitted with a truncated-cone-shaped head 80 forming a valve, which closes the end of the tubular part 78 and opens outwardly. The opening of the valve 80 is effected, as in the case of Fig. 1, by means of a rod 81, moved by the trigger of the spray-gun and acting on a rocking lever 82 co-operating with the right-hand end of the rod 79. A return spring 83 constantly tends to close the valve 80.

The tubular part 78 serving to bring up the liquid is borne by a part 84 which can slide slightly inside the nozzle 75. It is fixed to a liquid-intake tube 85 which is of a certain length and has a certain flexibility. In the position shown in the drawing, the valve 80 is open and the part 84 is in its extreme left-hand position. As soon as pressure on the trigger ceases, the lever 82 rocks to the right, the rod 79, under the action of the spring 83, is brought back to the right, the valve 80 shuts and the part 84 moves slightly to the right, thus leaving a passage at 86 restoring communication between the interior of the air-tube and the inlet end of the nozzle 75. A blower (not represented) such as the one described on Figs. 1 and 2 supplies air at a slightly higher pressure than that of the atmosphere to the air-tube 71; this air can then penetrate into the nozzle by its inlet end 86 and pass through the latter in expelling the particles of liquid that may be found there. The instant the trigger of the spray-gun is again pressed the lever 82 rocks to the left, causing the part 84 to shift at the same time as far as the position shown, closing the inlet end 86 of the nozzle and the orifice of the valve 80, as shown in the drawing. The liquid brought along by the pipe 85 thus issues from the valve formed by 78 and 80, reaches the nozzle and is sprayed as it leaves 77 under the action of the air escaping from the air-tube through the orifice 74.

The end of the part 71 of the air-tube presents two diametrically opposed slits 87, 88. It also presents two similar slits at 90° distance not shown in the drawing. The cap 72 presents two lower passages 89, 90 opening in an oblique direction slightly in advance of the orifice 74. By turning the cap 72 on the part 71, the passages 89 and 90 can be made to coincide with the slits 87 and 88 or with the other two slits placed 90° distant. In the position represented on Fig. 5, the air leaving the passages 89 and 90 flattens the atomised jet issuing at 74 and gives it the form of a horizontal stream. By turning the cap 72 90°, a similar jet is produced but flattened vertically. In the other angular positions of the cap 72, the passages 89 and 90 have no effect and the jet keeps its circular shape.

The device according to Fig. 5 offers the advantage, as proved by experience, of being able to work at very low pressure—i. e., to utilise air compressed by a small blower driven by an electric motor of very low power. It is thus not necessary, for obtaining a good spraying of paint, to use air compressed by a compressor.

The device according to Fig. 5 offers the further advantage of avoiding the formation of a mist when the paint is atomised, for the particles produced are not fine enough for that. They are, however, sufficiently small to ensure an impeccable coat of paint.

Finally it is to be remarked that the device according to Fig. 5 possesses the great advantage of avoiding any fouling of the nozzle both in the case of the use of air at high pressure and in that at low pressure. This fouling is avoided by the air sweeping the inside of the nozzle after the closing of the valve 80.

The fact that the part of the nozzle situated beyond the valve 80 is free from any obstruction greatly contributes to the success of the two advantages mentioned.

In a variant, it could be provided that the outlet end of the air-tube formed by the cap 72, as well as the end 77 of the nozzle 75, be flat-shaped (in that case, the cap would not necessarily have the passages 89, 90). Such a construction would give an atomised jet in a flat stream. The metering structure formed by the part 78 and the valve 80 would naturally keep its easily constructed circular shape.

Lastly, it is not essential that, in every case, the parts 72 and 75 should be mechanically integral with each other. Communication between the inlet end of the nozzle 75 and the interior of the air-tube may be effected otherwise than as described.

Reference is made to my copending application, Serial Number 67,779, filed December 29, 1948, and entitled "Nozzle for Spray Guns." That application amplifies the present disclosure of, and claims, the nozzle per se.

What I claim is:

1. A spray-gun for paints and other liquids, comprising an electric motor and fan unit; a housing enclosing said unit; a handle grip for said housing, the interior of which is curved and provides an air-inflow passage; and means within said air-inflow passage for filtering the air, said means comprising a lining disposed against that curved inner surface of said grip which serves to guide the inflow air through said passage, so that impurities contained by the inflow air are projected by centrifugal force against said lining, said lining being of a material adapted to retain said impurities.

2. A spray-gun for paints and other liquids, comprising an electric motor and fan unit; a housing enclosing said unit and having receiving means at its bottom for the removable attachment of a receptacle for the liquid to be sprayed; said motor and fan unit being operably mounted within said housing on a rotative axis which is substantially horizontal in the normal position of the spray-gun, and said motor and fan unit being disposed immediately above said receiving means and partially depending therebelow; a handle grip defined by said housing above the said axis of rotation of the motor and fan unit and extending from a point proximate the rear of said unit to a point over the front portion thereof; and spray nozzle means operatively associated with said motor and fan unit, immediately forwardly thereof and within said housing, for spraying liquid, said nozzle means having a liquid-intake pipe extending below said housing into the zone of said receptacle, the longitudinal axes of said handle grip and said nozzle means being located in and extending along a vertical plane which passes longitudinally through the said rotative axis of the motor and fan unit.

3. A spray gun for paints and other liquids, comprising a housing defining a nozzle portion, a handle portion, and a casing portion disposed between said nozzle portion and said handle portion; a blower for air; an electric motor arranged to actuate said blower, said blower and electric motor being operably mounted within said casing portion of the housing, and said casing portion having means associated therewith for removably receiving and securing a receptacle for liquid to be sprayed; liquid-delivery means extending from the nozzle portion of the housing into the zone occupied by the interior of said receptacle when attached to said housing; and air-inlet passage means disposed in said handle portion in communication with said casing portion, whereby the blower sucks air across the motor prior to delivering it to said nozzle portion of the housing, the said blower and motor having their rotative axes lying in a plane substantially parallel with the normally horizontal liquid level in the receptacle, and lying within a normally vertical plane which is common to the longitudinal axes of the said nozzle portion and handle portion of the housing, and said casing portion of the housing extending into said zone occupied by the interior of the receptacle.

4. A spray gun for paints and other liquids, comprising a housing defining a nozzle portion, a handle portion, and a casing portion disposed between said nozzle portion and said handle portion; a blower for air; an electric motor arranged to actuate said blower, said blower and electric motor being operably mounted within said casing portion of the housing; a diaphragm separating the blower from the nozzle portion of the housing; circumferential passage means formed in said housing peripherally of the blower and communicating with the casing portion and the nozzle portion through said diaphragm; and air-inlet passage means disposed in said handle portion in communication with said casing portion, whereby the blower sucks air across the motor prior to delivering it to said nozzle portion of the housing.

5. The combination recited in claim 4 wherein the circumferential passage means comprise a pair of substantially semi-circular, diametrically opposite passages, each having communication with the housing portion and the nozzle portion of the casing.

6. A spray gun for paints and other liquids, comprising a housing defining a nozzle portion, a handle portion, and a casing portion disposed between said nozzle portion and said handle portion; a blower for air; an electric motor arranged to actuate said blower, said blower and electric motor being operably mounted within said casing portion of the housing; means associated with the casing portion of the housing for removably receiving and retaining a receptacle for liquid to be sprayed; passage means for liquid extending from said nozzle portion into the zone occupied by the interior of said receptacle when attached to the said housing; a tubular nozzle element disposed within said nozzle portion, and communicating with said passage for liquid; resilient valve means normally closing the discharge end of said nozzle element; trigger-operated means for opening said valve means; and air-inlet passage means disposed in said handle portion of the housing in communication with said casing portion, whereby the blower sucks air across the motor prior to delivering it to said nozzle portion of the housing.

7. A spray gun as recited in claim 6, wherein a plurality of spaced, rectilinear radial fins are disposed about the tubular nozzle element within the nozzle portion of the housing, for forcing air, passage through said nozzle portion about said tubular nozzle element, to flow along substantially flat trajectories.

8. A spray gun for paints and other liquids, comprising a housing defining a nozzle portion, a handle portion, and a casing portion disposed between said nozzle portion and said handle portion; a blower for air; an electric motor arranged to actuate said blower, said blower and electric motor being operably mounted within said casing portion of the housing; air-inlet passage means disposed in said handle portion in communication with said casing portion, whereby the blower sucks air across the motor prior to delivering it to said nozzle portion of the housing; and air filter means disposed within the air-inlet passage means.

CHARLES REINHOLD.

REFERENCES CITED

The following references are of record in the file of this patent:

UNITED STATES PATENTS

| Number | Name | Date |
|---|---|---|
| 40,847 | Macy et al. | Dec. 8, 1863 |
| 593,732 | Burck | Nov. 16, 1897 |
| 1,260,522 | De Vilbiss | Mar. 26, 1918 |
| 1,401,397 | Day | Dec. 27, 1921 |
| 1,822,622 | Hermann | Sept. 8, 1931 |
| 1,875,729 | Hermann | Sept. 6, 1932 |
| 1,899,749 | Deutsch | Feb. 28, 1933 |
| 1,911,603 | Breuer | May 30, 1933 |
| 2,069,352 | Brookshire et al. | Feb. 2, 1937 |